US007747984B2

(12) United States Patent
Hsu

(10) Patent No.: US 7,747,984 B2
(45) Date of Patent: Jun. 29, 2010

(54) AUTOMATIC TEST CASE FOR GRAPHICS DESIGN APPLICATION

(75) Inventor: Siu Chi Hsu, Hong Kong (CN)

(73) Assignee: Microsoft Corporation, Redmond, WA (US)

( * ) Notice: Subject to any disclaimer, the term of this patent is extended or adjusted under 35 U.S.C. 154(b) by 1064 days.

(21) Appl. No.: 11/421,029

(22) Filed: May 30, 2006

(65) Prior Publication Data

US 2007/0279701 A1 Dec. 6, 2007

(51) Int. Cl.
G06F 9/44 (2006.01)
G06F 9/45 (2006.01)

(52) U.S. Cl. .................. 717/124; 717/125; 717/134; 717/135; 717/138

(58) Field of Classification Search .............. 717/124, 717/135, 125, 134, 138; 345/581; 382/293
See application file for complete search history.

(56) References Cited

U.S. PATENT DOCUMENTS

| 5,636,297 | A * | 6/1997 | Eller et al. ............... 382/293 |
| 6,633,300 | B1 * | 10/2003 | Tomack et al. ........... 345/581 |
| 7,425,958 | B2 * | 9/2008 | Berger et al. ............. 345/427 |
| 7,426,717 | B1 * | 9/2008 | Schang et al. ............ 717/124 |
| 7,490,319 | B2 * | 2/2009 | Blackwell et al. ......... 717/124 |
| 7,523,447 | B1 * | 4/2009 | Callahan et al. .......... 717/135 |
| 2004/0267320 | A1 * | 12/2004 | Taylor et al. .............. 607/2 |
| 2005/0160321 | A1 * | 7/2005 | Cleaveland et al. ........ 714/38 |
| 2007/0240118 | A1 * | 10/2007 | Keren ...................... 717/124 |
| 2008/0144978 | A1 * | 6/2008 | Yourlo et al. ............. 382/321 |
| 2008/0192062 | A1 * | 8/2008 | Guinan et al. ............ 345/581 |

OTHER PUBLICATIONS

Li et al, "Transparent Sharing and Interoperation of Heterogeneous SingleUser Applications", Nov. 2002, ACM, pp. 246-255.*
Celentano et al, "Observing and Adapting User Behavior in Navigational 3D Interfaces", May 2004, ACM, pp. 275-282.*
Meszaros, "Agile Regression Testing Using Record & Playback", Oct. 2003, ACM, pp. 353-360.*
Sun et al, "Specification-Driven Automated Testing of GUI-Based Java Programs", Apr. 2004, ACM, pp. 140-145.*

* cited by examiner

*Primary Examiner*—Wei Y Zhen
*Assistant Examiner*—Charles Swift

(57) ABSTRACT

A target graphics document containing graphics data may be used as a starting point to automatically generate one or more test cases as a sequence of test events to re-create the appearance of the target graphics document. The target document may be examined to determine the layers, graphics data within each layer, and the attributes of the graphics data. Based on the determined data, a sequence of input device actions may be generated to create a test document having graphics data based at least in part on the target document. In some cases, the generated input device actions may create a test document containing graphics data identical to that of the target document. In some cases, some user randomness may be applied to the generated input device actions to simulate 'real-world' user inaccuracy. In some cases, typical user manipulation of an input device may be applied to simulate 'real-world' usage.

16 Claims, 3 Drawing Sheets

AUTOMATIC TEST CASE FOR GRAPHICS DESIGN APPLICATION

BACKGROUND

One of the events in the life cycle of software development is testing, which may extend across the whole development cycle of the software from design, coding, alpha, beta, release, etc. Software testing typically involves devising a test case (or a set of test cases), running the development software with the test case as input, and validating that the performance of the software with the test case as an input yields the expected results. Software testing typically can be conducted manually by humans or programmatically, referred to as automated software testing.

A suite of test cases may include test cases for addressing individual features (e.g., functional testing), a plurality of features or components (e.g., integration testing), one or more different types of interactions with features (e.g., mode of interaction through mouse, keyboard, digitizer, stylus, etc.), and any other type or combination of testing. Writing a test case for each of these features, interactions, input modes, etc., typically requires writing a separate method for executing the test for each feature, and for each feature, a test for each of the input modes, and duplicating the rest of the test script. Executing such test cases imposes a stimulus on the application and helps ensure that the application responds in an expected manner to a specific stimulus, and did not respond in an unexpected manner.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In creating a test case for a graphics design application, a test developer typically manually writes code for testing each feature, which can be tedious to create and/or edit, even for simplistic actions. The test cases are often de-bugged or tested themselves to ensure proper integration and communication with the application to be tested.

In the case of a graphics design application which can generate a graphics document, it may be used to have a target driven approach to creating test cases (i.e., test scripts of instructions to test features of a graphics design application). Thus, a previously generated target graphics document containing graphics data may be used as a target result to generate test scripts of instructions to test features of a graphics design application. Specifically, the target graphics document may be used as a starting point to automatically generate one or more test cases as a sequence of arbitrarily detailed test events that use the graphics design application to re-create the appearance of the target graphics document.

To generate a test case from a target document, the target document may be examined to determine the layers, graphics data within each layer, and the attributes of the graphics data. Based on the determined data, a sequence of input device actions (e.g., mouse, keyboard, menu, tablet events) may be generated to create a test document having layers, graphics data, attributes and the like based at least in part on the target document. In some cases, the generated input device actions may intend to create a test document containing layers, graphics data, attributes, etc. identical to that of the target document. In some cases, some user randomness may be applied to the generated input device actions to simulate 'real-world' user inaccuracy (e.g., hand jitter, pauses, wandering of the mouse over the screen, etc.). In some cases, typical or atypical user manipulation of an input device may be applied to simulate 'real-world' usage. For example, for a given input device applicator trail, the speed of the applicator (e.g., mouse icon, stylus, etc.) may be adjusted to accelerate from rest at the starting point of the trail and decelerate to stop at the ending point. In another example, a higher speed may be attributed to user device applicator movement from a lower left to upper right direction, assuming that the user is right-handed, and slower in other directions which may be awkward for a right-handed user.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
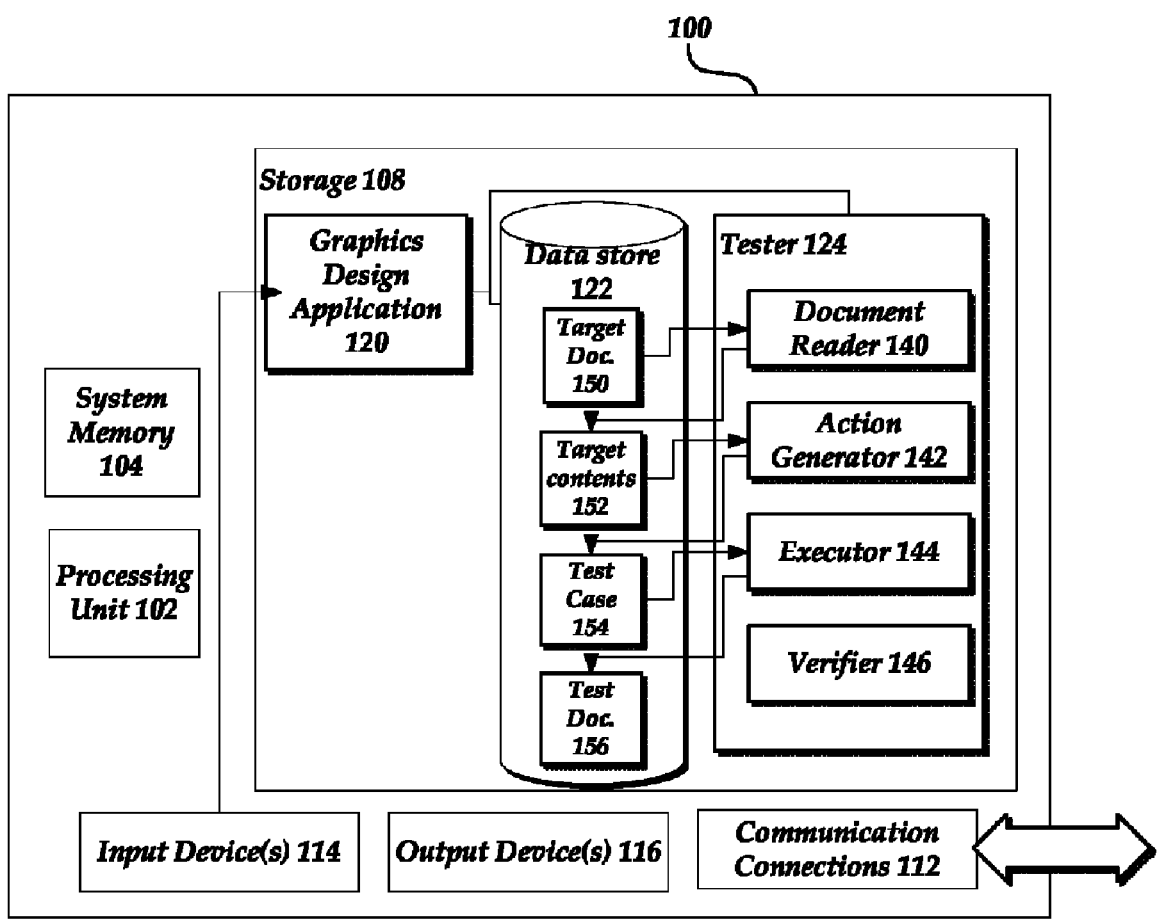
FIG. 1 is a block diagram of an example computing system for a graphics design system.

FIG. 1 and the following discussion are intended to provide a brief, general description of a graphics design system 100. As shown in FIG. 1, a graphics design system 100 may be provided by one or more computing devices 106. Computing device 106 of FIG. 1 and the following discussion are intended to provide a brief, general description of a suitable computing environment in which all or a portion of a graphics design system may be implemented. The operating environment of the computing device 106 of FIG. 1 is only one example of a suitable operating environment and is not intended to suggest any limitation as to the scope of use or functionality of the operating environment. Other well known computing systems, environments, and/or configurations that may be suitable for use with a graphics design system 100 described herein, include, but are not limited to, personal computers, server computers, hand-held or laptop devices, multiprocessor systems, micro-processor based systems, programmable consumer electronics, network personal computers, mini computers, mainframe computers, distributed computing environments that include any of the above systems or devices, and the like.

In its most basic configuration, computing device 106 typically includes at least one processing unit 102 and memory 104. Depending on the exact configuration and type of computing device, memory 104 may be volatile (such as RAM), non-volatile (such as ROM, flash memory, etc.) or some combination of the two.

Additionally, device 106 may also have additional features and/or functionality. For example, device 106 may also include additional storage 108 (e.g., removable and/or non-removable). Computer storage media includes volatile and nonvolatile, removable and non-removable media implemented in any method or technology for storage of information such as computer readable instructions, data structures, program modules, or other data. Memory 104 and storage 108 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which can be used to store the desired information and which can be accessed by device 106. Any such computer storage media may be part of memory 104 and/or storage 108.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Device 106 may contain one or more communication connection(s) 112 that allow the device 106 to communicate with other devices, such as with other computing devices through a network (not shown). Communications connection(s) 112 is an example of communication media. Communication media typically embodies computer readable instructions, data structures, program modules or other data in a modulated data signal such as a carrier wave or other transport mechanism and includes any information delivery media. The term 'modulated data signal' means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media.

Device 106 may have one or more input device(s) 114 such as keyboard, mouse, pen, stylus, voice input device, touch input device, laser range finder, infra-red cameras, video input devices, and/or any other input device. Output device(s) 116 such as one or more displays, speakers, printers, and/or any other output device may be included.

Although not required, the graphics design system will be described in the general context of computer-executable instructions, such as program modules, being executed by one or more computers or other devices. Generally, program modules include routines, programs, objects, components, data structures, etc., that perform particular tasks or implement particular abstract data types. Typically, the functionality of the program modules may be combined or distributed as desired in various environments.

The computing device 106 of the graphics design system may include one or more modules stored in any suitable manner, such as in the memory 104 and/or in the storage 108. As shown in the example of FIG. 1, the storage 108 may contain (or contain a reference to) modules for implementing the graphics design system such as a graphics design application 120, graphics tester 124, and a data store 122.

In the example of FIG. 1, the graphics tester 124 is shown on the same computing device 102 as the graphics design application 120 to be tested. It is to be appreciated that the graphics tester and the graphics design application may reside on the same or different computing devices.

The graphics tester 124 of FIG. 1 may include one or more modules such as a document reader 140, action generator 142, executor 144, and verifier 146. It is to be appreciated that the graphics tester may provide any number of components in any format to provide the functionality discussed herein.

The document reader 140 may examine a received target document 150 to determine the contents 152 of the target document. The target document may be any suitable graphics design document, which may be generated by the application 120 or any other graphics design application. The determined contents of the target document may be any contents of a graphics document, such as any number of layers which may be of the same or differing type (e.g., pixel data, vector object data, etc.), graphics data in each layer (e.g., pixel data, vector object data, etc.), attributes of the graphics data (e.g., pixel data; coordinate frame data; property data such as color, brush type, etc.; filter data; deformation data; and the like). The contents of the target document may be determined in any suitable manner such as by examining meta-data associated with the document or vector objects in the document, building up unstructured pixel data through a multi-resolution analysis such as by applying a low pass filter to identify pixel groupings in the document having similar characteristics or attributes, etc. The document reader may store the determined target document information in any suitable manner, such as in the data store 122 or system memory 104 of FIG. 1.

The action generator 142 receives the contents 152 of the target document 150. Based on the contents of the target document, the action generator generates one or more instructions for a script of a test case 154 to emulate or simulate a user creating a test document having layers, graphics data, attributes and the like based at least in part on the target document. For example, the test case may open a new document, open layers of the same type as that in the target document, and each layer having graphics data (e.g., pixel data, vector objects data, etc.) having attributes based on the layers, graphics data, attribute data of the target document.

The test case script may be generated in any suitable manner. In one example, the action generator may determine the current position/status, etc. of the graphics design application from a current display of the graphics design application based their visual appearance on the screen, rather than querying the application on the location/status/etc. of the displayed features. In another example, the data store 122 of FIG. 1 may include an application data store which associates a feature of the graphics design application (e.g., tools such as brushes, vector object creation tools, etc.) with an access component for determining a location and functionality of the feature of the graphics design application. For example, the application data store may associate a tool name (e.g., rectangle tool) with a function or application program interface ("API") which exposes an aspect of the graphics design application not available to general users. The function or API may be used to access the graphics design application to determine the location (e.g., screen position) of the associated feature interface device, determine a current status of the feature (e.g., up/down sate of a button, slider position, etc.), determine how to change the status or make a selection with the feature, and how to use the feature in a correct status to generate the desired graphics data in the test document.

The functions or APIs to access the graphics design application may access any suitable feature of the graphics design application, including for example, status of interface devices such as up/down state of a button, visibility and contents of text boxes, slider position, position of palette controls, collapse/expand state of windows and palettes, Z-overlapping ordering and visibility of windows or palettes, etc.; zoom/magnification of a particular window; screen positions of control points or handles of objects within a document window; etc.

For example, the action generator may determine a location of a window by calling the graphics application's function name TAGetUncoveredWindowRect("SeaShore.xpr") and the graphics application may return the screen coordinates of the rectangular frame of the window if it is available. If the window is not available (e.g., is not open or covered by other windows), the action generator may return an error.

In another example, the action generator may examine the graphics data of the target document and determine that is it desirable to have a particular zoom/pan view to give the user input device enough room/precision to generate the graphics data. Thus, the action generator may determine the current zoom/magnification parameters of the current picture view by querying the graphics design application through a function call or API and compare the current zoom/magnification with the size of the target graphics data and determine if the zoom/pan needs to be modified (e.g., drag the ruler over, drag a scroll bar over, click on a magnification button, etc.).

In another example, the number of available windows (tool windows, palettes, etc.) may be impractical to display all at once and uncovered. Thus, the action generator may determine which windows or palettes are required for a particular graphics data generation and close all unnecessary windows (through user input device actions) and open and correctly locate the required windows outside the required work area. This may involve determining a current status of windows in the graphics design application, comparing that current status with a required status, generating user input device actions to 'click' a 'close' button (other suitable user interface interaction such as a menu choice, keyboard control, etc.) and generating user input device action to open, size and locate the required windows through the set of function calls or APIs. Similar status and action generation may be accomplished to set layers, windows, tool (brush, pencil tool, rectangle tool, smudger, blur tool, etc.), and graphics data property (color, line type, corner type, shadowing, etc.), filter type, deformation data, etc. for the desired graphics data to be generated.

A feature may be accessed and/or manipulated by more than one user interface control. For example, a feature may be accessed through one or more user input device manipulations (e.g., a button selection in a palette or tool box, a drop down menu from the title bar, a pop-up dialog box with text boxes or other menu selections, a keyboard shortcut, etc.). Thus, the data store may store more than one user interface device control for a particular feature. In generating the user input device action, the type of user input device to be tested may be considered such as a mouse, a stylus, a keyboard etc. to help select from the plurality of controls. Additionally or alternatively, the specific user interface control to be tested may be considered in selecting from the plurality of controls. For example, in one test case, the keyboard shortcut may be tested, and in another test case, the dialog box may be tested.

It is to be appreciated that any of the available user input control may be selected alone or in combination as appropriate for the desired test case and/or in view of the target document contents.

After the status of the required tool or feature is determined, the user input device applicator actions (e.g., 'clicks' and motion on the screen) may be generated in any suitable manner for creating the desired graphics data. For example, if a rectangle is to be drawn, the coordinates of the resulting rectangle may be determined from the target document content data and used to generate a series of user input device 'click' and 'drag' movements for drawing the rectangle at the correct size and location on the display. The series of user input device 'click' and 'drag' movements may be accessed from the data store 122 as a generalized series of actions and updated with the specific desired coordinate (location/size) information based at least in part on the target content data.

In some cases, the generated input device actions may intend to create a test document containing layers, graphics data, attributes, etc. identical to that of the target document. In this case, the target content data may be used to set the location, size, attributes, etc. of the user device action. In some cases, a particular graphics data may be 'drawn' on the digital surface in a plurality of ways (e.g., a rectangle may be drawn by clicking and dragging across the horizontal direction and then the vertical direction, diagonally, etc.). The action generator may select one of the plurality of available series of actions or may chose two or more of the plurality of actions to create a plurality of test cases 154 testing different user interactions with the graphics design application.

In some cases, some user randomness may be applied to the generated input device actions to simulate 'real-world' user inaccuracy (e.g., hand jitter, pauses, wandering of the mouse over the screen, etc.). The user randomness may be integrated into the generated user device actions in any suitable manner, such as by adding a random noise to values from the target content data, adding fine-grained jitter to the mouse movement from one point to the next, adjusting the speed of user input device applicator to introduce random pauses, wandering of the mouse over the screen when not in use, etc.

In some cases, typical user manipulation of an input device may be applied to simulate 'real-world' usage, as opposed to robotic movement of a user input device in direct straight-line movements with speed, direction, etc that are not indicative of a human user. Specifically, less than perfect or indirect movement, timing, speed, direction, selection, etc. may be simulated or added to the user input device actions, which may 'capture' or detect more or different types of errors in the graphics design application. For example, for a given input device applicator trail, the speed of the applicator (e.g., mouse icon, stylus, etc.) may be adjusted to accelerate from rest at the starting point of the trail and decelerate to stop at the ending point. Specifically, after a 'click down' event, the speed of the user interface applicator across the screen may accelerate from 0 to the desired speed (which may be different for different test cases) and then decelerate towards the end of the trail or other transition point (e.g., transition from horizontal movement to vertical movement in creating a rectangle) to 0. Thus, the maximum speed of the user input device applicator may be determined by the slope and/or curvature of the path or trail to be traversed. In this manner and in any other appropriate manner, a sequence of user interface applicator positions may then be generated along the trail at different times to simulate such applicator movement.

A general mouse/input device movement trail can be specified as a sequence of movement sections, each with a path geometry, an entry speed (V1), a target speed (V2), an exit speed (V3), a max acceleration (ACC, a positive value) and a max deceleration (DEC, a negative value). The adjacent sections may be connected to each other and the exit speed of one section may match the entry speed of the next section for the overall movement to appear continuous.

To simulate a simple mouse movement from one position to another position, a movement trail with one single section could suffice. In one example, the entry speed could be 0 (starting from stationary), with a moderate target speed of say 80 pixels/second and an exit speed of say 10 pixels/second (i.e., the mouse continues to move at the exit point, e.g., releasing a click before the mouse comes to rest completely). A max acceleration and deceleration of 1000 pixel/second$^2$ may be specified. In another example, for a realistic simulation, a trail may be split into sections across certain corner or other transition points (e.g., points where a path changes from a positive slope to a negative slope) such that a different target speed is employed along positive and negative sloped sections.

For each movement section, given the entry, exit and target speed and max accelerations, that particular movement section may be separated into 3 parts including an entry part (traveling at speed from V1 to V2), a constant speed part (traveling at V2) and an exit part (traveling at speed from V2 to V3). Firstly, the entry acceleration time (TA1) and the exit acceleration time (TA2) may be determined. The entry acceleration time is the time needed to reach the target speed from the entry position. The exit acceleration time is the time needed to get from the target speed to the exit speed at the exit position.

The acceleration/deceleration at the entry part may be denoted as ACC1 and that at the exit part may be denoted as ACC2, which may be determined using:

$$ACC1=ACC \text{ if } V2>V1; \text{ or } =DEC \text{ if } V2<V1 \qquad (1)$$

$$ACC2=ACC \text{ if } V3>V2; \text{ or } =DEC \text{ if } V3<V2 \qquad (2)$$

Using the determined acceleration for the entry and exit parts, the time (TA1 and TA2) needed for the entry and exit parts may be determined in any suitable manner, such as by using:

$$TA1=(V2-V1)/ACC1 \qquad (3)$$

$$TA2=(V3-V2)/ACC2 \qquad (4)$$

The distance L2 the mouse needs to travel to get to V2 from the start position may be determined given ACC2, such as by using:

$$L1=V1*TA1+\tfrac{1}{2}(ACC1*TA1^2) \qquad (5)$$

Similarly, the exit acceleration/deceleration distance L2 may be determined using:

$$L2=V2*TA2+\tfrac{1}{2}(ACC2*TA2^2) \qquad (6)$$

It is possible that the distance of the entry and exit parts (L1+L2) is actually longer than the total length (L) of the path section as indicated by the target document graphics data. In this case, the input device (e.g., mouse, stylus, etc.) does not have enough time to get to the target speed V2 before the input device needs to slow down (or speed up) to get to the exit speed at the exit position. If the path section is short enough, it might not even be possible to get from V1 to V3 even with the short distance with the given acceleration ACC and deceleration DEC values.

In the first case where the input device does not have enough time to get to the target speed in the entry part, the target speed may be sacrificed and the values of the time of the entry part T1, time of the exit part T2, and the lengths of the entry and exit parts L1 and L2 may be based on a possible or attainable target speed (Q). The attainable target speed Q may be determined in any suitable manner, such as by using:

$$L1=\tfrac{1}{2}(Q^2-V1^2)/ACC1 \qquad (7)$$

$$L2=\tfrac{1}{2}(V2^2-Q^2)/ACC2 \qquad (8)$$

$$L1+L2=L \qquad (9)$$

Solving Equations (7), (8), and (9) gives a possible solution for determining the attainable target speed Q as:

$$Q=(2S*ACC1*ACC2+ACC2*V1^2-ACC2*V2^2)/(ACC2-ACC1) \qquad (10)$$

Using the newly determined attainable target speed, the times for the entry and exit parts TA1 and TA2 may be recalculated using:

$$TA1=(Q-V1)/ACC1 \qquad (11)$$

$$TA2=(V2-Q)/ACC2 \qquad (12)$$

which may then substituted back into Equations (7) and (8) to get the updated lengths of the entry and exit parts L1 and L2.

In the second case where it may not be possible to get from V1 to V3, in order to maintain the boundary speed V3, the input device may be forced to accelerate/decelerate from V1 to V3 directly at whatever acceleration appropriate. The appropriate acceleration ACC2 may be determined in any suitable manner, such as by using:

$$ACC2=\tfrac{1}{2}(V2^2-V1^2)/L \qquad (13)$$

Hence, the time of the entry part TA1 may be determined using:

$$TA1=(V3-V1)/ACC1 \qquad (14)$$

$$TA2=0 \qquad (15)$$

the time for the exit part is zero since the exit part no longer exists. In a similar manner, the lengths of the entry part L1 may be determined and the length of the exit part L2 may be set to zero.

With L1, L2, TA1, TA2, ACC2 and ACC2 determined, the individual input device movement events (records of input device positions with time stamps) can be generated incrementally for each of the entry, constant speed, and exit parts using any suitable approach. For example, the input device events may be generated by chopping up the parts at constant time steps or at constant length steps.

In another example, a higher speed may be attributed to user device applicator movement from a lower left to upper right direction, assuming that the user is right-handed, and slower in other directions which may be awkward for a right-handed user. It is to be appreciated that any suitable user interaction may be added to the script of user device actions such as extra clicks, speed of clicks, positioning over the user interface device control, hovering of the applicator over controls, modifier key state changes in the middle of a user interface applicator drag sequence, etc. as appropriate.

The script or set of instructions of the test case generated by the action generator may be stored in any suitable manner and in any suitable format. For example, the script of the test case may be stored in a data store which may be a part of the data store 122 or system memory of FIG. 1. The script may be written in any appropriate programming language such as, for example C, C#, C++, Pascal, object-oriented languages, etc. An example script for opening a document and generating a rectangle is shown below, however, it is to be appreciated that any language, format, and storage may be used:

```
Test Script
App=LaunchApplication("graphicsesignapplication.exe");
GenMenuEvent(app, "File", "New");
Docrect = app->TAFindWindowRect("untitled");
GenMouseEvent(app, MouseMove, docrect.top+10,
  docrect.left+10);
GenMouseEvent(app, MouseDown, docrect.top+10,
  docrect.left+10);
GenMouse Event(app, MouseMove, ...)
...
GenMouseEvent(app,MouseUp):
Objlist+app->FindDocObjectList("untitled");
If (objectlist->NObjects()!=1) say("Exactly one object should have
been created");
GenMenuEvent(app, "File", "Quit");
```

After or in conjunction with generation of the user device actions of the test case 154, the executor 144 of FIG. 1 may execute the scripted actions against a version of the graphics design application to generate a test document 154 containing graphics data generated by the user input actions. For example, in some cases, the test case may be generated, and then the text-based scripted actions may be compiled and executed against a current and/or later version of the graphics design application. In another example, the generated user device actions may be substantially immediately executed against a version of the graphics design application. For example, the auto-generated test script of the test case may be fed directly to the graphics application on the fly instead of going through a text-based form and then be re-compiled and executed.

After execution of at least a portion of the test case, the verifier 146 of FIG. 1 may verify that the generated graphics data of the test document 156 matches the expected graphics data. In one example, the document reader may be used to determine (screen read of displayed graphics, accessing meta-data of the test document, etc.) the contents of the generated test document. The contents of the test document may then be compared with the expected results of the user device actions generated by the action generator, as opposed to test validation which would compare the test document contents against the target document contents 152. In another example, the verifier may include logic to compute the expected results independently and in parallel with the graphics application being tested. The result computed on the verifier may be compared with the result of the test document produced by the application in view of execution of the test case.

As noted above, the test document may be only substantially similar to the target document. For example, the contents of the target and test documents may differ in any aspect including user random movements, different tool usage, 'incorrect' selection of color due to randomness of user interface applicator use, simulated jitter in a stroke, etc. For example, if the target document includes a perfectly circular object the action generator may select the free-hand tool (as opposed to the vector object circle creation tool) and generate a set of user device actions that trace as closely as possible to the true circle, but even if user randomness is not added, the resulting graphics data of the test document would not be a 'perfect' circle due to the sparseness and round-off error in the discretized mouse points and curve fitting process of the test document graphics data. However, this result would be what was expected from a circular object generated by the freehand pen tool, so the verifier checks not that the test document contents are 'perfect' but rather what is expected, e.g., a reasonably fitted smooth path in a circular shape based on the mouse event generated at the current screen magnification. If the test document contents are not what is expected, then the verifier may set an appropriate action, which may include any one or more flag particular features or test document graphics data for further testing or analysis, stop further execution of the test case, and the like.

It is to be appreciated that any suitable data store in any suitable format may be used to store and/or communicate the target document, the target document content, test case, test case contents, application data store, and any other information stored in a data store to the graphics design system 100, including a relational database, object-oriented database, unstructured database, an in-memory database, or other data store. A storage array may be constructed using a flat file system such as ACSII text, a binary file, data transmitted across a communication network, or any other file system. Notwithstanding these possible implementations of the foregoing data stores, the term data store and storage array as used herein refer to any data that is collected and stored in any manner accessible by a computing device.

Figure 2:
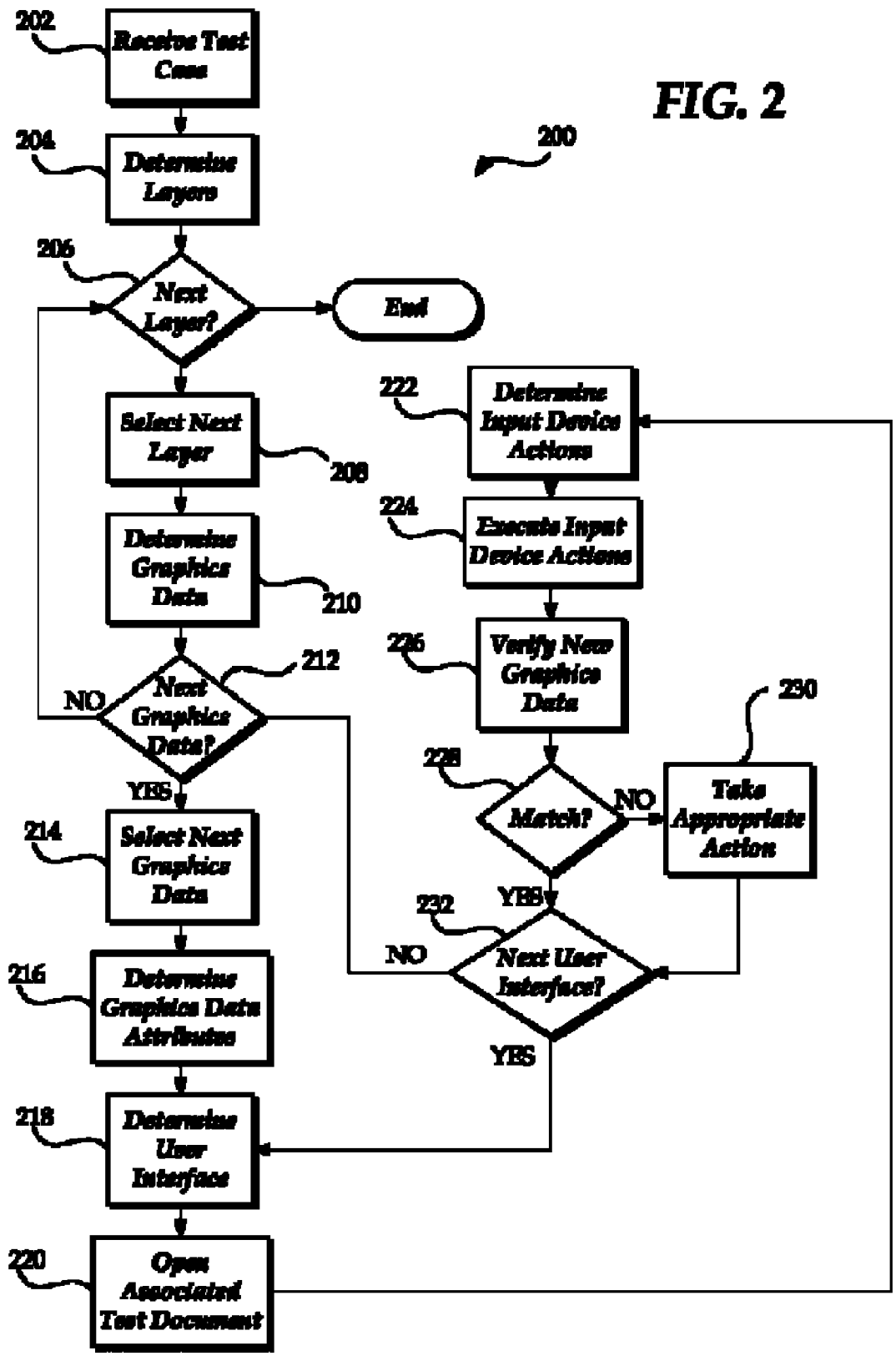
FIG. 2 is a flow chart of an example method of automatically generating a test case based on a target document.

FIG. 2 illustrates an example method 200 of automatically generating a script of a test case and will be described with reference to the graphics design system 100 of FIG. 1, although it is to be appreciated that any other graphics design system may implement the method as described. A target document may be received 202 in any suitable manner such through a network connection, retrieved from memory, etc. The target document may be a plurality of target documents, with each target document containing one or more layers and/or graphics data to be used to generate a test case. The layers within the target document may be determined 204 in any suitable manner, such as by the document reader 140. For example, meta-data associated with the document may be examined to determine the number of layers, and relative position of layers (e.g., which layer is 'below' another layer, etc.). The information about the determined layers may be stored in any suitable manner, such as in a target contents data store or document.

If there is a next (or additional) layer to be analyzed 206, the next layer to be analyzed may be determined 208 in any suitable manner. For example, the bottom layer may be selected or any other of the layers to be analyzed may be selected.

In the selected layer, the graphics data in the layer may be determined 210 in any suitable manner. As noted above, if the layer is a vector object type layer, the number of objects in the layer may be determined by counting the vector object trees or other data associated with a vector object may be examined, the location relative to the document digital surface, relative placement (e.g., layering of objects within the layer), and the like may be determined. If the layer is a pixel data layer, a low pass filter or any other suitable technique may be used to find broad color areas. The information about the graphics data of the selected layer may be stored in any suitable manner, such as associated with a layer identifier in a target contents data store or document.

If there is a next (or additional) graphics data to generate user device actions 212, the next graphics data portion may be selected 214 (e.g., vector object, broad segment of pixel data, etc.). For the selected graphics data, the attributes of the graphics data may be determined 216 in any suitable manner. For example, for a vector object, the object tree may be examined to determine the tool used to create the object, the properties of the tool (such as color, brush, stroke type, etc.), the filters applied to the object, the deformations applied to the object, and the like for pixel data, the status and relative location of the pixels may be determined. The information about the graphics data of a layer may be stored in any suitable manner as noted above.

The user interface to test may be determined 218 in any suitable manner and may be done by the action generator 142 of FIG. 1. For example, a tester may provide data to test a particular input device (mouse, keyboard, stylus, etc.) or one or more of available user input devices may be selected in any suitable manner, such as randomly, sequentially in order, and the like. A test document for the particular target document and selected input device may be opened 220 in any suitable manner. For example, a scripting program may be accessed to open a document for storing the generated script instructions for the user device actions.

The input device actions to generate the selected graphics data in the selected layer may be determine 222 in any suitable manner, and may be done by the executor 144 of FIG. 1. The input device actions to generate the selected graphics data may include generating input device commands to emulate a user opening or accessing a layer of the appropriate graphics data type in the test document, setting the appropriate display attributes, setting the appropriate graphics data manipulation tool controls, setting the appropriate graphics data attributes, and generating user input device commands for emulating drawing test graphics data substantially similar to that of the selected graphics data. As noted above, the input device commands emulating a user input device applicator may have typical or atypical movement, timing, speed, direction, selection, etc. to simulate a real-world user. For example, user input device applicator movement and actions (e.g., clicks) may be emulated with user input device commands which follow an indirect path, with varying speed and/or acceleration, hesitations, jitter, etc. applied to the input device commands. An example method of determining input device actions is described further below with respect to FIG. 3. The generated input device actions may be stored in the test document in any suitable manner. In some cases, the test document may be the system memory 104 of FIG. 1, and substantially immediately executed 224 in the graphics design application. In other cases, the input device actions script may be stored in the test document for later execution 224 of the input device actions in the graphics design application.

After executing the user device actions for the selected graphics data, the generated graphics data may be verified 226 in any suitable manner, and may be done by the verifier 146 of FIG. 1. If the generated graphics data does not substantially match the target graphics data 228, any suitable action may be taken 230. For example, a flag of an error may be sent, the test case generation may be stopped, the selected graphics data may be set to 'un-selected' and the action generator may later attempt to generate 'correct' user device action to generate the graphics data, etc. As noted above, the graphics data of the test document need not be identical as the graphics data of the target document (e.g., a 'hand-drawn' circle vs. a circle generated with a circle tool), but only substantially similar. The level of substantial similarity may be any suitable level appropriate for the type and level of test.

If a plurality of user interface device (e.g., keyboard, mouse, stylus, voice commands, etc.) interactions are to be tested and/or user interface device controls (e.g., buttons, dialog boxes, etc.) are to be tested in the same test document, the method may determine if there is a next user interface to test 232 and return to determining 218 the next user interface device or control to test. If another user interface device or control is to be tested, the resulting input device actions may be stored in the current test document or stored in another associated test document. In this manner, the plurality of user interactions with the graphics design application may be tested in combination or individually. If no other user devices or control are to be tested, the method may return to determining 212 if there is a next graphics data in the selected layer to be examined. In the case of vector objects, the next vector object may be selected 214. In the case of pixel data, the generated pixel data of the test document may be compared to the pixel data of the selected layer to determine if there is still pixel data to be generated. In this manner, broad strokes may be used to generate large color fields, and smaller brush strokes to fill in the details of the target document as an iterative approach to crating the test document based on the target document. If there are no other graphics data in that layer to be examined, the method may return to determining 206 if there is another layer in the target document to examine. If there are no other layers to examine, the method may end and the test case may be stored in any suitable manner. The generated graphics data from the execution of the input device action may be stored in any suitable manner such as in a test document, which may be associated with the test case.

Figure 3:
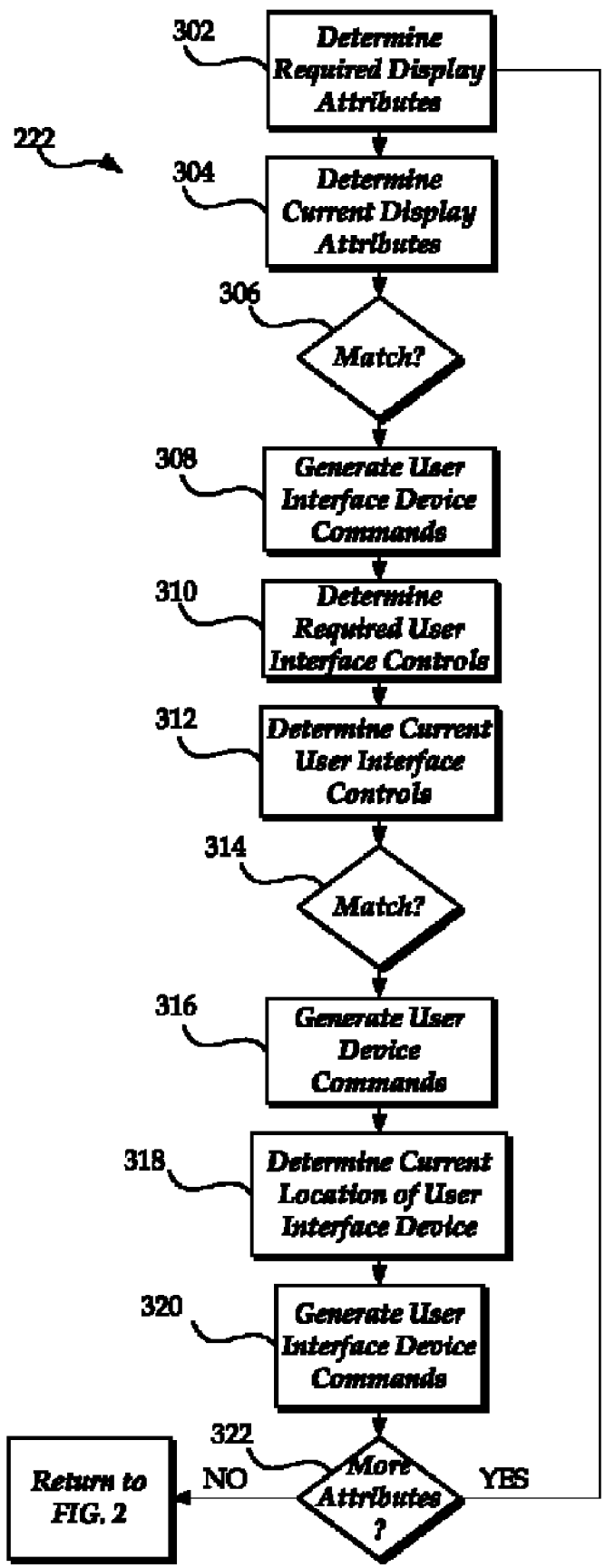
FIG. 3 is a flow chart of an example method of determining input device actions of FIG. 2.

FIG. 3 illustrates an example method of determining 222 input device actions of the method 200 of FIG. 2. Based on the determined attributes of the selected graphics data, the required display attributes may be determined in any suitable manner. The required display attributes may include any one or more of the workspace to be accessed (which may include determining the status, location, zoom/pan, etc.); the windows, toolboxes, palettes, etc. which may need to be accessed (such as graphics data manipulation tools, tool attribute modification toolboxes, palettes, dialog boxes, etc.); and the like for example, it may be desirable for graphics data of a particular fidelity, size, location, etc. to dynamically zoom or pan the view of the current layer (like a real user would do) in order to give the user input device enough room and/or precision to create a substantially similar graphics data.

The current display attributes of the graphics design application may be determined 304 in any suitable manner, such as through a display analysis, a function or API call to the application, etc. The display attributes may include any one or more of the current workspace area, location, zoom, pan, etc.; the location and status of open windows, toolboxes, palettes, etc.; status of layers; and the like.

If the current display attributes match 306 the required display attributes, the method may continue to determining 310 the required user interface control as discussed further below. If the current and required display attributes do not match, then user interface commands to set the current display attributes to the required display attributes may be generated 308. For example, a window may be selected, resized, zoomed, panned, palettes may be opened and/or closed to reveal the desired workspace (while leaving open the windows, toolboxes, palettes for later anticipated interactions, etc.). The user input device commands may include commands to emulate a user input device such a mouse movements, clicks, keyboard strokes, etc. to set the display attributes. To determine the user input device commands to change the display attributes, an application data store may be accessed to find the display attribute to be accessed (e.g., open a particular layer), determine the actions required to open a particular layer (e.g., select a layer option in the title bar, select a layer selector in a layer toolbar, etc.), and generate suitable instructions to emulate those indicated actions (e.g., move the applicator or mouse icon to the designated location, click on the menu bar, move the move down the menu and select the indicated layer). As noted above, the user input device actions such as movements and mouse clicks may be randomized or modified to emulate a real user, such as including wandering of the applicator, pauses, speed and direction of movement, and the like.

The required user interface control data may be determined 310 based on the determined attributes of the selected graphics data of the target document. The required user interface control data may include the tools and tool attributes desired to generate the graphics data based on the target document content. As noted above, the desired tools may not be the same tool used to generate the target document graphics data. For example, a circle tool may have been used in the target document to create a circle, but the tool to create a substantially similar graphics data in the test document may be a free-hand tool. In one example, an application data store may be access to determine which available tools may be used to generate particular graphics data, and from that list, a particular tool may be selected. The required attributes of the tool may be selected based on the attributes of the selected graphics data of the target document, which may include any one or more of color, opacity, brush type, line thickness, paint pickup, smudging, stamp frequency, etc.

The current user interface controls may be determined 312 in any suitable manner such as by analyzing the display of the graphics design application, through a function or API call to the application, and the like. For example, the status, location, state, visibility, etc. of the required user interface controls may be determined (e.g., if the color palette for a tool is available, its location in the display, etc.). The controls may include any one or more of a selector, a button, a slider, a window, a text box, a menu selection, etc.

The current user interface controls may be compared 314 to the required user interface controls to determine if they match. If they match, the method may continue with determining 318 the location of the user interface applicator as discussed further below. If they current and required user interface controls do not match, then the user interface device commands to change the user interface controls to match the required user interface control settings may be generated 316. For example, a toolbox may be selected or opened and a particular tool (such as a brush smudger, filter, etc. may be selected, and its attributes modified such as by selecting a correct color in an associated color palette, a transparency may be modified by a slider or text box, etc. The user input device commands may include commands to emulate a user input device such a mouse movements, clicks, keyboard strokes, etc. to interact with displayed user input controls. To determine the user input device commands to interact with the user interface controls, an application data store may be accessed to find the user interface control to be accessed (e.g., select a particular tool), determine the actions required to select the tool (e.g., select a button or open a dialog box and select from a drop down menu, etc.), and generate suitable instructions to emulate those indicated actions (e.g., move the applicator or mouse icon to the designated location, click on the drop down menu, move the move down the menu and select the indicated tool). As noted above, the user input device actions such as movements and mouse clicks may be randomized or modified to emulate a real user, such as including wandering of the applicator, pauses, speed and direction of movement, and the like.

The current location of the user input device applicator (e.g., mouse icon) may be determined 318, if necessary, such as by analyzing the display of the graphics design application, sending a function call or accessing an API of the graphics design application or operating system to determine the location of the applicator, etc. For example, if a stylus is used, the test case may assume that the user may pick up the stylus and directly move it to the desired location in the display without requiring any interaction from the operating system (e.g., mouse icon movement) or the graphics design application. If a mouse user input device is to be emulated, then the current location of the user input device applicator, e.g., mouse icon may be determined.

The commands to create a substantially similar graphics data in the test document based on the selected graphics data of the target document may be generated 320. As noted above, the graphics data of the test document may not be identical to the target document (e.g., a circle created with a circle tool vs. a free-hand tool). The generated commands may be determined in any suitable manner such as by accessing a general list of commands for creating particular objects and applying desired values based on the selected graphics data of the target object. For example, if a blue rectangle is to be created in the upper right hand corner of the current layer, the prior steps may ensure that the upper right hand corner of the layer is active and visible and the rectangle tool is selected with the correct attributes of the blue color, line width, transparency, etc. the user input device commands may then be generated to mouse the mouse icon to the upper left location of the rectangle in the layer, clicking the mouse, moving the mouse towards the upper right corner, moving the mouse down to the lower right corner, and then un-clicking the mouse to generate a script for generating a blue rectangle. As noted above, the user input device actions such as movements and mouse clicks may be randomized or modified to emulate a real user, such as including wandering of the applicator, pauses, speed and direction of movement, jitter, and the like. In some cases, a plurality of general mouse movements may be provided (e.g., there are more than one way to 'draw' a rectangle), and one or more of the ways of drawing the graphics data may be selected or determined.

In some cases, one or more attributes of the graphics data of the test document may be modified after it is generated (e.g., changing the color or line width of the rectangle after it is drawn, applying a filter, etc.). Thus, the method may determine if there are more attributes to be set for the selected graphics data 322, and if so, return to determining 302 the required display attributes. If no more attributes of the graphics data need be modified, then the method may return to the method 300 of FIG. 3 as appropriate.

Thus, the graphics design system and/or method illustrated herein show how to create a plausible drawing process with actual user input device interaction (rather than just function calls to tools of an application) based on a target document containing graphics information. The same target document may be used to automatically create one or more test cases, each testing one or more combinations of user input devices (mouse, stylus, keyboard shortcuts, etc.), user interface controls (buttons, sliders, dialog boxes, etc.), user graphics design creation interactions (e.g., creating a rectangle with a rectangle tool vs. a free-hand tool, creating a rectangle by drawing first the horizontal direction and then the vertical direct, drawing the rectangle with a diagonal movement, etc.), and the like. In this manner, a test case may be automatically generated to create a script of user device inputs to create a graphics design document substantially similar to a target graphics design document, which may or may not be of the same type or even application as the graphics design application test document.

While the many embodiments of the invention have been illustrated and described, it will be appreciated that various changes can be made therein without departing from the spirit and scope of the invention. For example, randomness or user speed, direction, hesitation in generating user device actions may be generated substantially simultaneously with generation of the user commands, as described above. Additionally or alternatively, the randomness, hesitation, jitter, etc. may be applied after 'perfect' user device commands are generated. Although the present examples are described and illustrated herein as being implemented in a graphics design system, the system described is provided as an example and not a limitation. As those skilled in the art will appreciate, the present examples are suitable for application in a variety of different types of object editing systems such as word processing applications where a text document with formatting, tables, etc. may be used as a target document, and autotyping and user device inputs may be generated to reproduce the formatting, text, graphics, and other objects of the target document.

The invention claimed is:

1. A method comprising:
receiving a target document containing target graphics data, the target graphics data including at least one of pixel data or vector object data;
based on the target graphics data, automatically determining input device actions in a graphics design application as a test case to emulate a user input device creating test graphics data substantially similar to the target graphics data; and
determining one or more graphics data attributes of selected graphics data of the target graphics data, wherein determining input device actions includes generating an input device action for selecting an appropriate graphics data attribute through a user interface control of the graphics design application.

2. The method of claim 1, further comprising determining layers in the target document, and wherein determining input device actions includes generating input device actions for selecting an appropriate layer in a test document.

3. The method of claim 1, wherein generating input device actions includes determining required display attributes of the graphics design application, determining current required display attributes of the graphics design application, and generating user input device actions for selecting, through a user interface control of the graphics design application, the required display attributes different from the current display attributes.

4. The method of claim 3, wherein determining input device actions includes determining required user interface controls for generating test graphics data substantially similar to the selected graphics data and generating user input device actions for selecting, through a user interface control of the graphics design application, a required status for user interface control for generating test graphics data.

5. The method of claim 1, further comprising executing the determined input device actions to form a test document containing test graphics data substantially similar to the target graphics data.

6. The method of claim 5, further comprising verifying the test graphics data.

7. The method of claim 1, wherein determining input device actions includes generating input device actions with indirect actions to emulate a real-world user.

8. The method of claim 7, wherein indirect actions includes one or more of a group comprising varying speed from one user applicator display position to another user application display position, hesitating timing of user input device actions, varying direction of user input device actions, varying selection speed of user input device selection actions.

9. One or more computer readable storage media having computer executable components comprising:
a graphics design application for manipulating graphics data;
a tester for receiving a target document containing target graphics data, the target graphics data including at least one of pixel data or vector object data, the tester including:
a document reader for determining the target graphics data of the target document; and
an action generator for automatically generating user device actions based on the target graphics data for a test case for generating test graphics data substantially similar to the target graphics data;
the document reader being configured to determine one or more graphics data attributes of selected graphics data of the target graphics data, and the action generator being configured to generate an input device action for selecting an appropriate graphics data attribute through a user interface control of the graphics design application.

10. The one or more computer readable storage media of claim 9, wherein the document reader determines meta-data associated with the vector object data of the target graphics data, and wherein automatically generating user device actions includes generating user device application commands to emulate a user input device interacting with user interface controls of the graphics design application.

11. The one or more computer readable storage media of claim 9, wherein the action generator generates user input device actions with varying speed along a path in a display of the graphics design application.

12. The one or more computer readable storage media of claim 11, wherein generating user input device actions with varying speed includes determining a sequence of user input applicator positions along a trail with a maximum speed of movement based at least in part by a slope and a curvature of the trail.

13. The one or more computer readable storage media of claim 9, wherein the action generator generates user input device actions with pauses in movement of a user input device applicator over a portion of a display of the graphics design application.

14. The one or more computer readable storage media of claim 9, wherein the action generator generates user input device actions with jitter in movement of a user input device applicator in a path over a portion of a display of the graphics design application.

15. A graphics design system comprising:
a memory in which machine instructions of a graphics design application and tester are stored;
a data store for storing a feature of the graphics design application associated with an access component for determining a location and functionality of the feature of the graphics design application; and
a processor that is coupled to the memory and the data store, the processor executing the machine instructions of the graphics design application and tester to carry out a plurality of functions, the machine instructions including:
means for determining a current status of the feature of the graphics design application;
means for determining target graphics data content of a target document, the target graphics data content including at least one of pixel data or vector object data;
based on the target graphics data content, means for automatically generating user input device actions of a test case for creating test graphics data substantially similar to the target graphics data content; and means for determining one or more graphics data attributes of selected graphics data of the target graphics data content, wherein the means for automatically generating input device actions includes means for generating an input device action for selecting an appropriate graphics data attribute through a user interface control of the graphics design application.

16. The graphics design system of claim 15, wherein the means for automatically generating user input device actions includes means for automatically generating typical, real-world user input device actions.

* * * * *